United States Patent [19]
Carlborg et al.

[11] Patent Number: 5,584,175
[45] Date of Patent: Dec. 17, 1996

[54] HEATING MEANS FOR CATALYST UNIT

[75] Inventors: Carl-Gustaf Carlborg; Erik Sundstrom, both of Sandviken, Sweden

[73] Assignee: Sandvik AB, Sandviken, Sweden

[21] Appl. No.: 325,236
[22] PCT Filed: Mar. 26, 1993
[86] PCT No.: PCT/SE93/00254
  § 371 Date: Nov. 17, 1994
  § 102(e) Date: Nov. 17, 1994
[87] PCT Pub. No.: WO93/21431
  PCT Pub. Date: Oct. 28, 1993

[30] Foreign Application Priority Data

Apr. 22, 1992 [SE] Sweden ................... 9201259

[51] Int. Cl.⁶ .................. F01N 3/00; F01N 3/10
[52] U.S. Cl. .................. 60/274; 60/284; 60/300; 422/174; 422/177; 422/180
[58] Field of Search ................... 422/174, 177, 422/180; 60/299, 300, 303, 274, 284

[56] References Cited

U.S. PATENT DOCUMENTS

| | | | |
|---|---|---|---|
| 3,768,982 | 10/1973 | Kitzner et al. | 422/177 |
| 4,456,457 | 6/1984 | Nozawa et al. | 55/283 |
| 4,647,435 | 3/1987 | Nonnenmann | 422/180 |
| 5,051,241 | 9/1991 | Pfefferle | 422/180 |
| 5,093,178 | 3/1992 | Sundström et al. | 428/156 |
| 5,094,074 | 3/1992 | Nishigawa et al. | 60/300 |
| 5,174,968 | 12/1992 | Whittenberger | 422/174 |
| 5,215,722 | 6/1993 | Nishizawa | 422/174 |
| 5,232,671 | 8/1993 | Bronson et al. | 422/174 |
| 5,246,672 | 9/1993 | Bak | 422/174 |
| 5,288,470 | 2/1994 | Cornelison et al. | 422/177 |
| 5,308,591 | 5/1994 | Whittenberger | 422/174 |

*Primary Examiner*—Nina Bhat
*Attorney, Agent, or Firm*—Burns, Doane, Swecker & Mathis, L.L.P.

[57] ABSTRACT

A ceramic monolith coated with a catalytic material is heated by a flat strip cross-section steel wire with at least 15% Cr and at least 0.5% Al. The wire is placed in the monolith near its entry face.

14 Claims, 1 Drawing Sheet

HEATING MEANS FOR CATALYST UNIT

BACKGROUND OF THE INVENTION

Catalyst units are, among other tasks, used for cleaning of exhaust gases from combustion engines through oxidation of hydrocarbons and reduction of oxides of nitrogen. The units are commonly made as a ceramic carrier monolith body with parallel channels, and with a surface coating of catalytically active material such as platinum, palladium or other metals. The catalytic materials require an elevated temperature in use to reach full activity. If no special means are employed, the activity is lowest when the exhaust contains mostly hydrocarbons right after the start of the engine. There is always some low activity, and the increasing temperature of the exhaust due to the exothermic reaction at the oxidation of the hydrocarbons will heat the whole catalyst unit to an active temperature after a while.

Different ways to preheat the catalyst unit before starting the engine have been suggested, such as making the monolith of electrically conducting material which is then heated by electric current or by magnetically induced eddy currents. Another suggestion has been to blow hot clean gas through the unit. These suggestions have disadvantages in requiring expensive or bulky auxiliary equipment. The invention describes means for rapid heating of cathalyst units comprising ceramic carrier monolith bodies.

DISCLOSURE OF THE INVENTION

A ceramic monolith comprises a great number of channels with thin walls coated with the cathalytic material. The monolith has an entry face and an exit face. According to the invention a metal wire is placed near the entry face across the channels. The wire is made of a heat resistant alloy such as chromium steel with at least 15% Cr, preferrably between 19% and 26%. The wire is preferrably made with a flat strip cross section which is oriented to reduce the resistance of the channels as little as possible, with the large diameter in the direction of the channels. At a start of the engine the wire is heated by an electric current, thereby heating also the adjoining catalytic material to full active temperature through heat radiation, heat conduction or by heating the gas flow. Oxidation of hydrocarbons will then soon yield enough energy to bring the whole monolith to an active temperature.

A further improvement is making the wire from a chromium steel containing also at least 0.5% aluminium, preferrably 4 to 6%. The metal wire will then have an oxide coat which can be durably coated with the same catalytic material as the monolith in the same operation. In such a case it is sufficient to heat the wire to the active temperature of the catalytic material, starting the oxidation of the hydrocarbons at the wire surface and bringing the monolith to an active temperature even faster.

BRIEF DESCRIPTION OF THE DRAWING

For a full understanding of the invention, the following detailed description should be read in conjunction with the drawing, wherein.

DETAILED DESCRIPTION OF THE PREFERRED EMBODIMENTS

Figure 1:
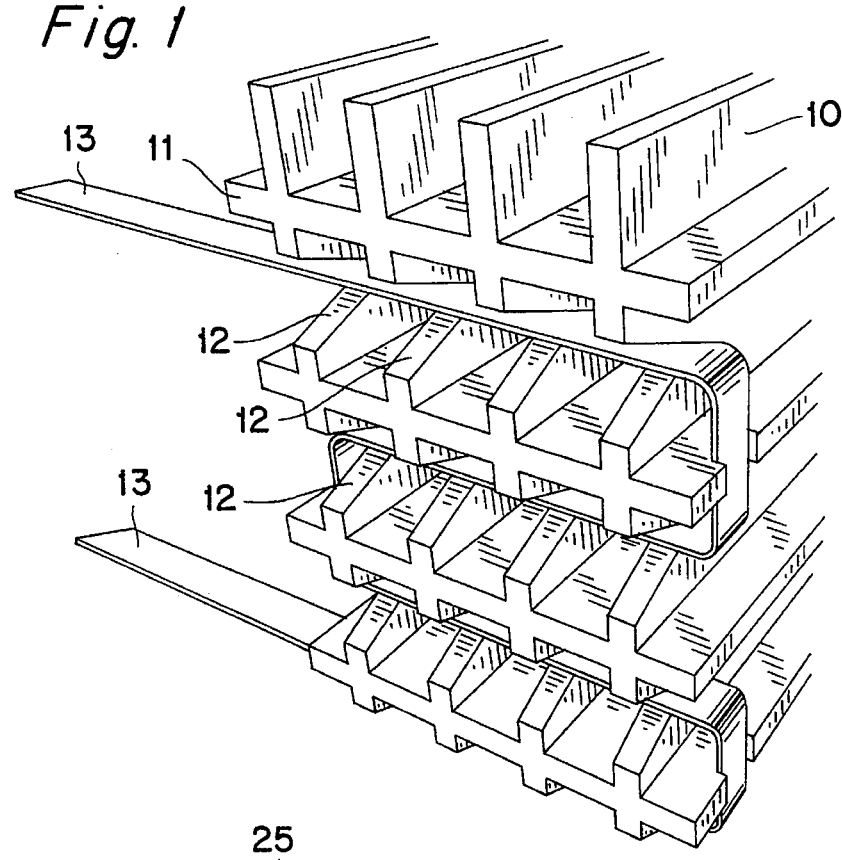
FIG. 1 is a perspective view of one embodiment of the invention employing a square shaped pattern monolith, and a metal wire with a flat strip cross-section.

Ceramic monoliths can be manufactured by different methods. Most common is extrusion according to European Patents EP 294 106 or EP 294 261 which are hereby incorporated by reference, and in which the channels form patterns of squares or concentric circles. FIG. 1 shows how grooves are created near the entry face (11) of a monolith (10) of this kind by removing parts of the walls (12), and how the metal wire (13) can be placed in the grooves and held by its elasticity. A metal wire with flat strip cross-section is preferrable because of lower flow resistance and larger available surface for catalytic coating. It is not necessary to let the wire (13) traverse all channels, since the heat will soon spread through the walls to other channels.

Figure 2:
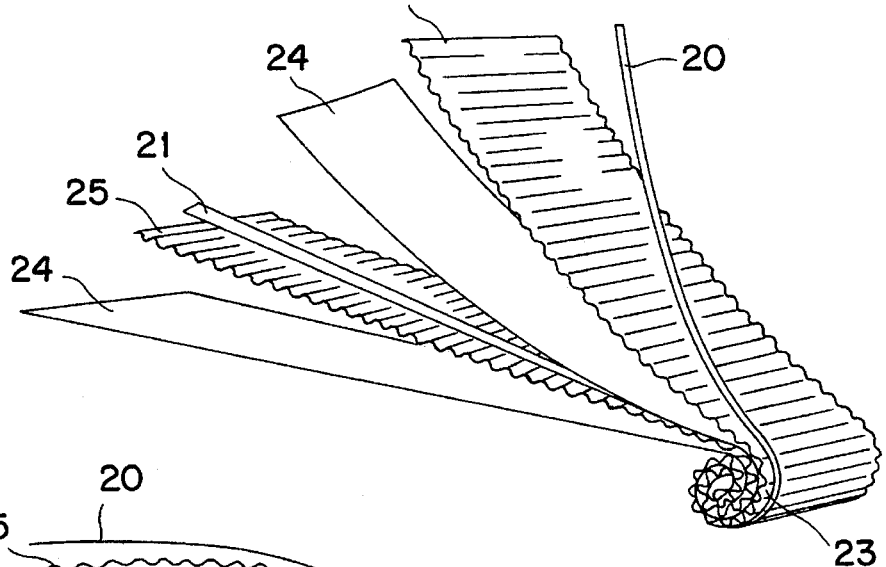
FIG. 2 is a perspective view of another embodiment of the invention using smooth and corrugated foils as the monolith with the flat wire therebetween.
Figure 3:
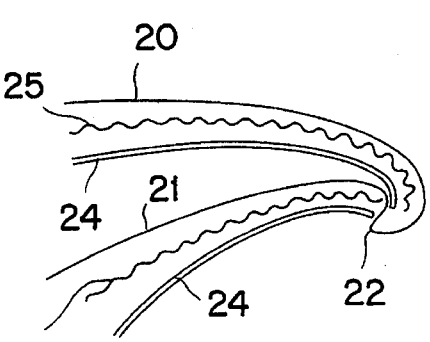
FIG. 3 is a side view of the initial position of the foils of the embodiment of FIG. 2.

Another type of ceramic monolith is described in U.S. Pat. No. 5,093,178 which is also incorporated by reference, as shown in FIGS. 2 and 3, the monolith is formed by making a coil of smooth (24) and corrugated (25) aluminium foils, which are later converted to aluminium oxide through anodic oxidation. With this type of monolith the wire can be placed between the foils during coiling, where FIG. 3 shows the initial position of the foils and the wire, and FIG. 2 shows a partially finished coil type monolith. For simplest electric connection, the wire is made as two legs (20,21) joined at a bend (22), with both legs terminating at the peripheral surface of the monolith. In this case it is important that the wire is made from an alloy that is not destroyed by the anodic oxidation. In this case, the chromium steel with at least 15% Cr and at least 0.5% Al is also suitable.

During coiling the wire (20,21) is placed near the edge (23) which will become the entry face of the monolith. The wire need not traverse all channels, and it is then possible to place one or more corrugated foils and one or more smooth foils (24) between the legs (20,21) of the wire. The wire is preferrably made with flat strip cross-section because of lower flow resistance.

The flat strip cross-section can be achieved either by flat rolling of a round wire or by slitting of wider strip into flat wires.

We claim:

1. A method for preheating the surface of a catalyst unit for combustion engines, comprising positioning adjacent the surface of the catalyst unit a metal wire heated by electric current, wherein the catalyst unit comprises a ceramic monolith with channels for flow of exhaust gas therethrough and an entry face where exhaust gas enters, the surfaces of said channels being coated with a catalyst, and wherein the metal wire is positioned within the monolith adjacent the entry face and traversing a plurality of said channels, such that the wire is exposed to the exhaust gas flow.

2. A method according to claim 1, wherein the wire is coated with the catalyst.

3. A method for preheating the surface of a catalyst unit for combustion engines, comprising positioning adjacent the surface of the catalyst unit a metal wire heated by electric current, wherein the catalyst unit comprises a monolith formed of a coil of alternating smooth and corrugated aluminum oxide having a catalyst on the surface thereof, and wherein the metal wire is positioned at least partially within the coiled surface, such that the wire is exposed to the exhaust gas flow.

4. The method of claim 3, wherein the monolith includes channels for flow of exhaust gas therethrough and an entry face where exhaust gas enters, the metal wire being positioned within the monolith and adjacent only the entry face.

5. A method according to claim 3, wherein the wire is coated with the catalyst.

6. A catalyst unit for combustion engines, comprising a ceramic monolith with channels for flow of exhaust gas therethrough, and having one entry face where exhaust gas enters the surfaces of said channels coated with a catalyst, and a metal wire positioned within the monolith adjacent the entry face and traversing a plurality of said channels, such that the wire is exposed to the exhaust gas flow, said metal wire being heated by an electric current.

7. A catalyst unit according to claim 6, wherein the wire has a flat strip cross-section.

8. A catalyst unit according to claim 6, wherein the wire is placed in a groove formed by removal of parts of the walls of the channels near the entry face.

9. A catalyst unit according to claim 8, wherein the monolith is formed by extrusion.

10. A catalyst unit according to claim 6, wherein the wire is made from chromium steel with at least 15% Cr.

11. A catalyst unit according to claim 6, wherein the wire is made from steel with at least 15% Cr and at least 0.5% Al.

12. A catalyst unit according to claim 6, wherein the wire is made from steel with from 19% to 26% Cr and from 4% to 6% Al.

13. A catalyst unit according to claim 6, wherein the wire is coated with the catalyst.

14. A catalyst unit according to claim 6, wherein the catalyst unit comprises a monolith formed of a coil of alternating smooth and corrugated aluminum oxide sheets having a catalyst on the surface thereof.

* * * * *